United States Patent
Davydyuk et al.

(10) Patent No.: US 7,296,918 B1
(45) Date of Patent: Nov. 20, 2007

(54) ILLUMINATED TIRE RIM APPARATUS

(76) Inventors: Dmitriy Davydyuk, 10730 Coloma Rd. #14, Rancho Cordova, CA (US) 95670; Valentina Davydyuk, 10730 Coloma Rd. #14, Rancho Cordova, CA (US) 95670

( * ) Notice: Subject to any disclaimer, the term of this patent is extended or adjusted under 35 U.S.C. 154(b) by 40 days.

(21) Appl. No.: 11/181,199

(22) Filed: Jul. 15, 2005

(51) Int. Cl.
*B60Q 1/26* (2006.01)

(52) U.S. Cl. ............ 362/500; 362/473; 362/485; 362/487; 362/565

(58) Field of Classification Search ........ 362/500, 362/487, 473, 485, 565
See application file for complete search history.

(56) References Cited

U.S. PATENT DOCUMENTS

| | | | |
|---|---|---|---|
| 2,949,869 A * | 8/1960 | Leeuwrik | 432/152 |
| D245,775 S | 9/1977 | Muth | |
| 5,497,302 A | 3/1996 | O'Donnel | |
| 5,634,707 A | 6/1997 | Bailey | |
| 5,683,164 A | 11/1997 | Chien | |
| 5,800,035 A | 9/1998 | Aichele | |
| D420,639 S | 2/2000 | Roesianto | |
| 6,045,244 A | 4/2000 | Dixon et al. | |
| 6,168,301 B1 | 1/2001 | Martinez et al. | |
| 6,220,733 B1 | 4/2001 | Gordon | |
| D461,153 S | 8/2002 | Koyama | |
| 2004/0130905 A1* | 7/2004 | Olds et al. | 362/487 |

* cited by examiner

*Primary Examiner*—Sandra O'Shea
*Assistant Examiner*—Mark Tsidulko

(57) ABSTRACT

An illuminated tire rim apparatus includes a hub that has a central aperture therein for receiving a free end of an axle of a vehicle. The hub has a plurality of bolt receiving openings therein positioned between the aperture and an outer edge of the hub. A plurality of spokes is attached to the outer edge of the hub and radially extends outwardly therefrom. Each of the spokes is comprised of a substantially translucent material and each of the spokes has an outer end. A rim has a generally cylindrical shape and has an inner surface and an outer surface. Each of the outer ends of the spokes is attached to the rim. Each of a plurality of light emitters is mounted in one of the spokes so that the spokes are illuminated when the light emitters are turned on. A power supply is electrically coupled to the light emitters.

4 Claims, 3 Drawing Sheets

ILLUMINATED TIRE RIM APPARATUS

BACKGROUND OF THE INVENTION

1. Field of the Invention

The present invention relates to illuminated tire devices and more particularly pertains to a new illuminated tire device for providing an illuminated rim having a plurality of translucent spokes.

2. Description of the Prior Art

The use of illuminated tire devices is known in the prior art. U.S. Pat. No. 5,497,302 describes a hubcap device that is attachable to a rim and which is selectively illuminated. Another type of illuminated tire device is U.S. Pat. No. 5,634,707 having a structure adapted for being attached to a wheel and which can be selectively turned on for illuminating the wheel. Yet another such device is found in U.S. Pat. No. 5,683,164 which again includes an assembly adapted for being attached to and illuminating a wheel.

While these devices fulfill their respective, particular objectives and requirements, the need remains for a device which includes integral components of a rim which are selectively illuminated. This can be accomplished with spokes of a rim that are translucent or transparent. This will also give the affect of having no spokes when the spoke are not illuminated and the rim is being rotated.

SUMMARY OF THE INVENTION

The present invention meets the needs presented above by generally comprising a hub that has a central aperture therein for receiving a free end of an axle of a vehicle. The hub has a plurality of bolt receiving openings therein positioned between the aperture and an outer edge of the hub. A plurality of spokes is attached to the outer edge of the hub and radially extends outwardly therefrom. Each of the spokes is comprised of a substantially translucent material and each of the spokes has an outer end. A rim has a generally cylindrical shape and has an inner surface and an outer surface. Each of the outer ends of the spokes is attached to the rim. Each of a plurality of light emitters is mounted in one of the spokes so that the spokes are illuminated when the light emitters are turned on. A power supply is electrically coupled to the light emitters.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
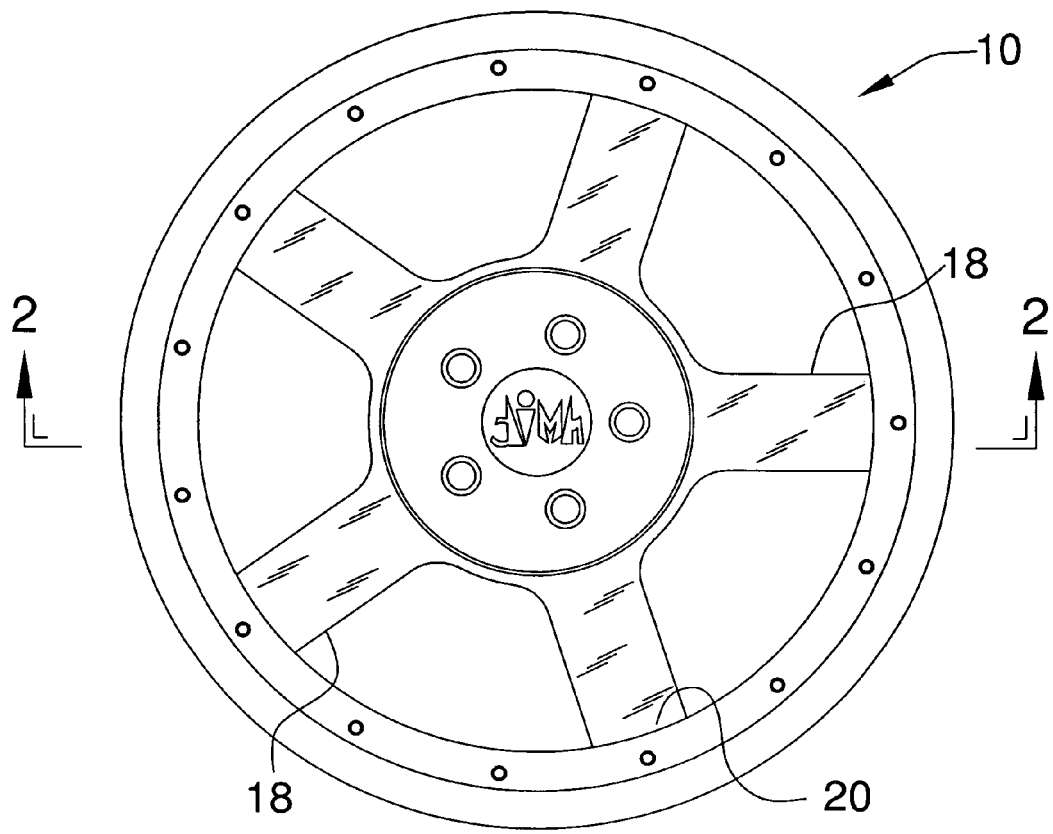
FIG. 1 is a front view of an illuminated tire rim apparatus according to the present invention.
Figure 2:
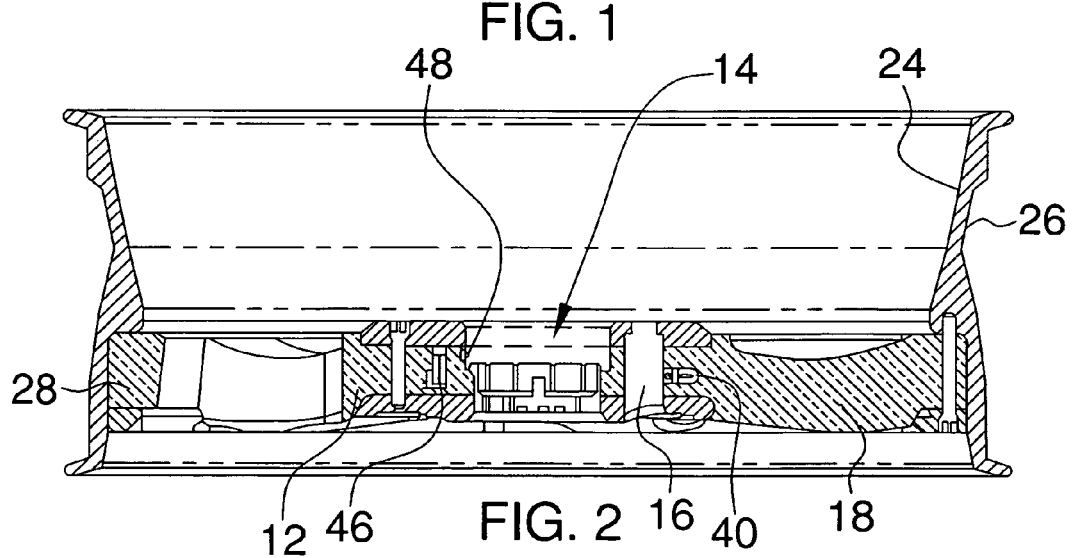
FIG. 2 is a cross-sectional view of the present invention.
Figure 3:
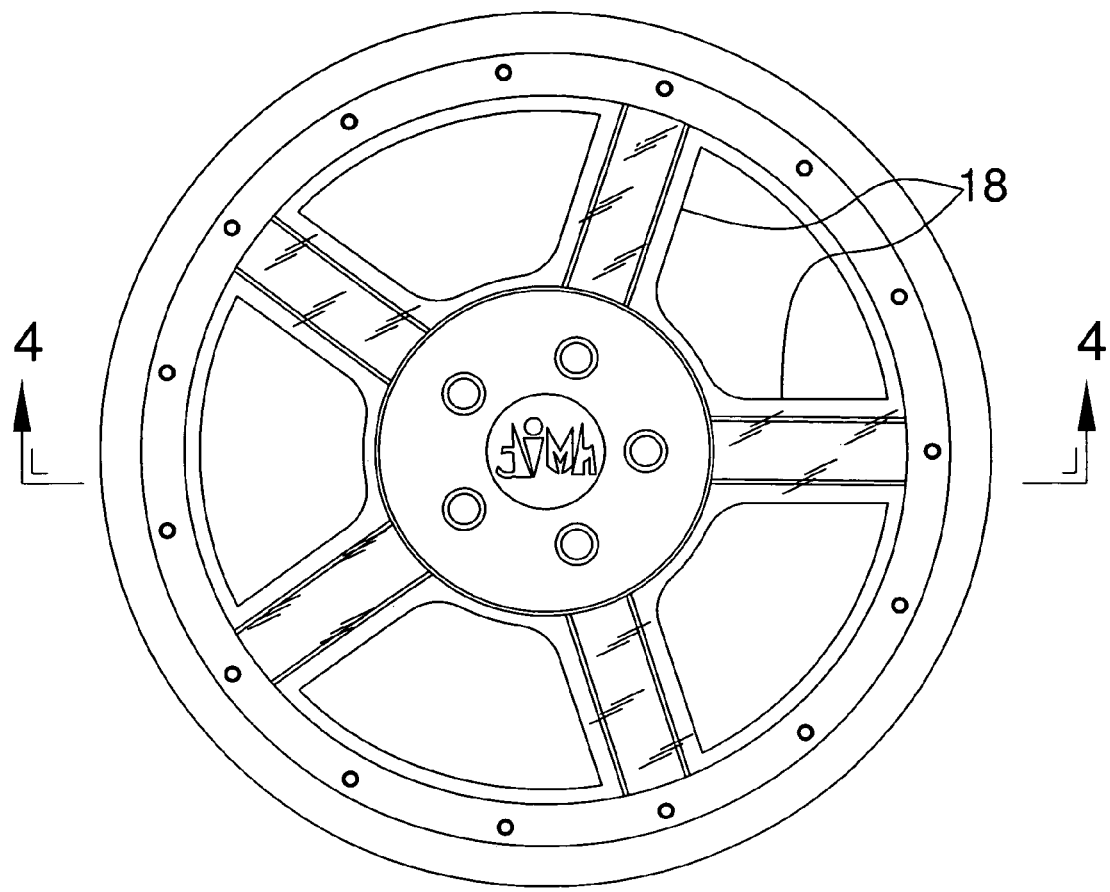
FIG. 3 is a front view of the present invention having support rods therein.
Figure 4:
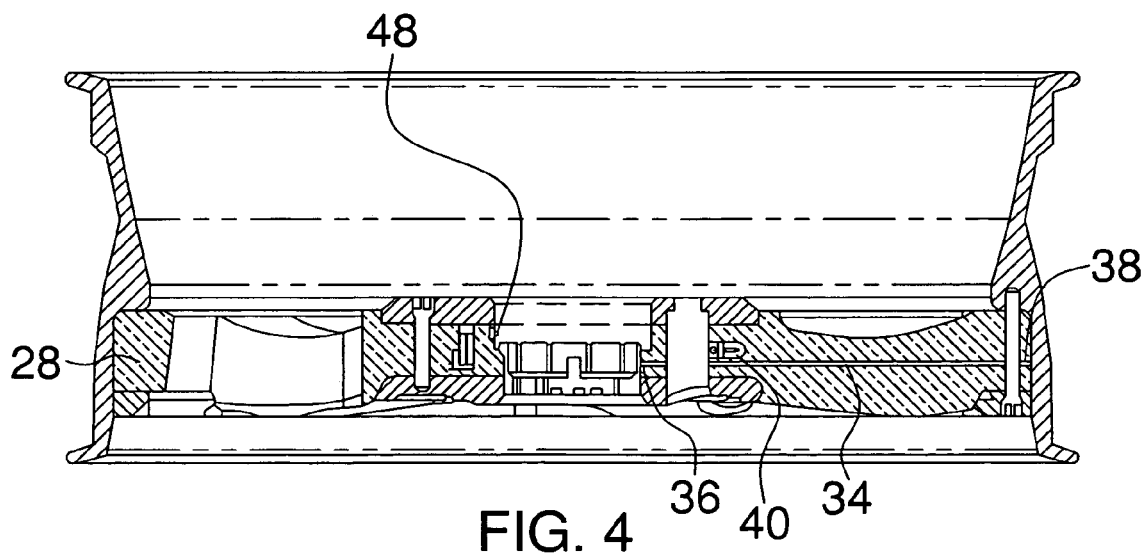
FIG. 4 is a cross-sectional view taken along line 4-4 of FIG. 4 of the present invention.
Figure 5:
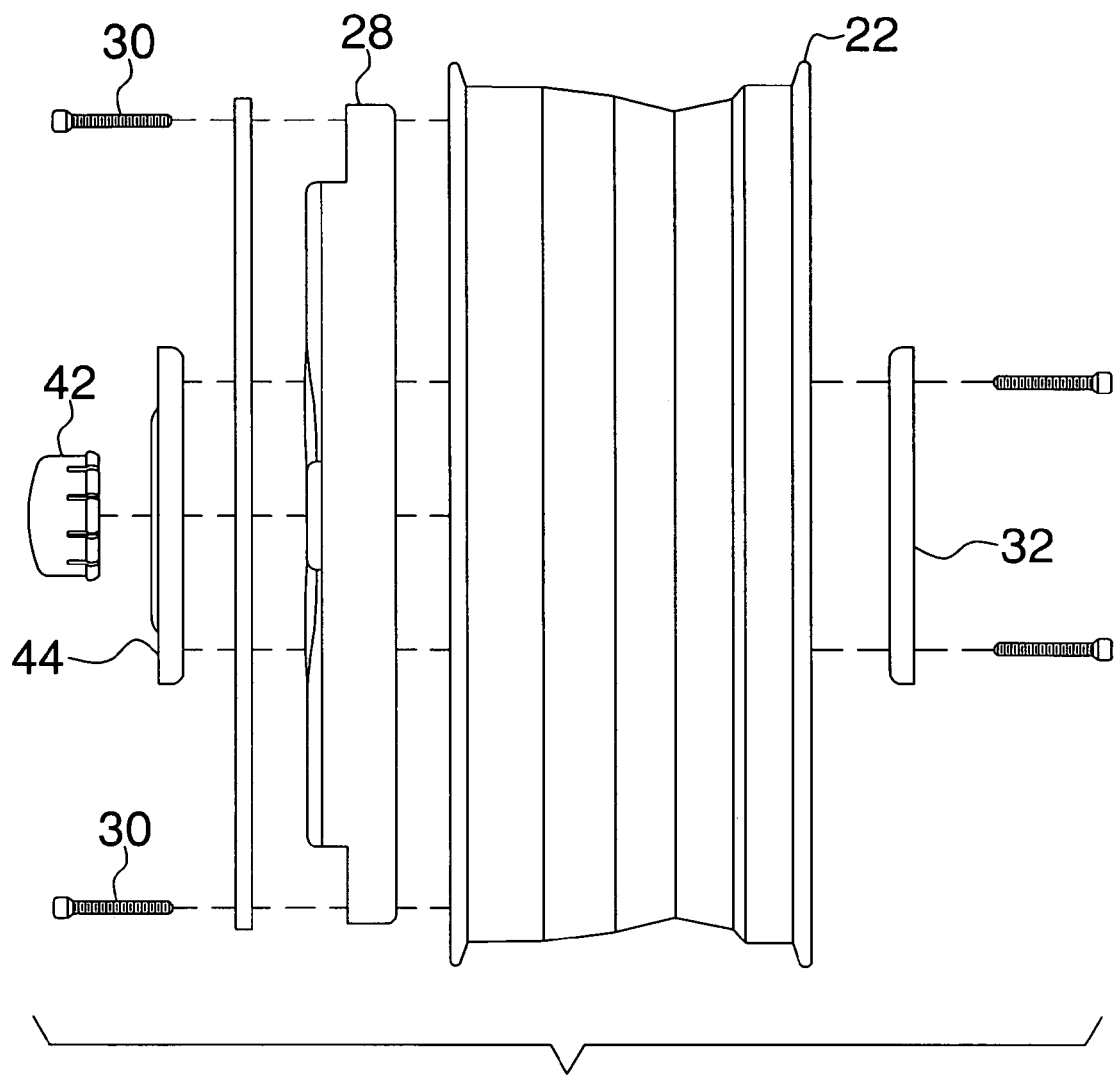
FIG. 5 is an expanded view of the present invention.
Figure 6:
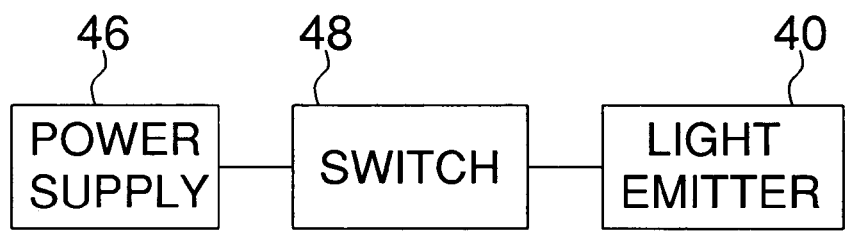
FIG. 6 is a schematic view of the present invention.

With reference now to the drawings, and in particular to FIGS. 1 through 6 thereof, a new illuminated tire device embodying the principles and concepts of the present invention and generally designated by the reference numeral 10 will be described.

As best illustrated in FIGS. 1 through 6, the illuminated tire rim apparatus 10 generally comprises a hub 12 that has a central aperture 14 therein for receiving a free end of an axle of a vehicle. The hub 12 has a plurality of bolt receiving openings 16 therein positioned between the aperture and an outer edge of the hub 12.

Each of a plurality of spokes 18 is attached to the outer edge of the hub 12 and radially extends outwardly therefrom. Each of the spokes 18 is comprised of a substantially translucent material. The translucent material is preferable a thermoplastic such a Plexiglas. It should be understood that translucent includes slightly opaque to completely transparent. Each of the spokes 18 has an outer end 20.

A rim 22 has a generally cylindrical shape and has an inner surface 24 and an outer surface 26. Each of the outer ends 20 of the spokes 18 is attached to the rim 22. The spokes 18 may be attached to rim 22 and hub 12 in a number of ways. One preferred way is to include an inner ring of translucent material, which forms the hub 12, and which is integrally attached to the spokes 18. An outer ring 28 of translucent material is attached to the outer ends 20 of the spokes 18 and the outer ring 28 is secured to the rim 22 with a plurality of fasteners 30. The rim 22 is comprised of a metallic material. A stabilizing ring 32 may be attached to the inner ring, or hub 12, to add strength to the hub 12.

A plurality of stabilizing rods 34 may be included. Each of the rods 34 has a first end 36 and a second end 38. Each of the first ends 36 is attached to the hub 12 and each of the second ends 38 is attached to the rim 22. The rods 34 are each positioned in one of the spokes 18 so that each of the spokes 18 has at least one rod 34 positioned therein. The rods 34 ensure that the spokes 18 are strong enough to hold the weight of a vehicle.

A plurality of light emitters 40 is provided. Each of the light emitters 40 is mounted in one of the spokes 18 so that the spokes 18 are illuminated when the light emitters 40 are turned on. Each of the light emitters 40 is positioned adjacent to the hub 12 and is directed toward the rim 22. This position aids in hiding the light emitters 40 from a person viewing the spokes 18. A cap 42 and cover 44 may be positioned over the hub 12 to aid in hiding the light emitters 40. A power supply 46 is electrically coupled to the light emitters 40. The power supply 46 may either be electrically coupled directly to a vehicle's power supply or at least one battery mounted in the hub 12. An actuator 48 is electrically coupled to the power supply 46 for selectively turning the light emitters 40 on or off. The actuator 48 may be a button positioned on the hub 12 or in the vehicle if the vehicle's power supply is being used. Alternatively, the actuator may include a switch that is actuated by centrifugal force so that the light emitters 40 are turned on when the hub 12 is rotated.

In use, the apparatus 10 is used as conventional rim on which a tire mounted. The rim is then mounted on a vehicle's axle. The spokes 18 provide the illusion that the rims are floating around the hubs 12 while the light emitters 40 add an ornamental affect.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminated tire mounting assembly comprising:
    a hub having a central aperture therein for receiving a free end of an axle of a vehicle, said hub having a plurality of bolt receiving openings therein positioned between said aperture and an outer edge of said hub;
    a plurality of spokes being attached to said outer edge of said hub and radially extending outwardly therefrom, each of said spokes consisting of a substantially translucent material, each of said spokes having an outer end;
    a rim having a generally cylindrical shape and having an inner surface and an outer surface, each of said outer ends of said spokes being attached to said rim;
    a plurality of light emitters, each of said light emitters being mounted in one of said spokes such that said spokes are illuminated when said light emitters are turned on; and
    a power supply being electrically coupled to said light emitters.

2. The assembly according to claim 1, further including a plurality of stabilizing rods, each of said rods having a first end and a second end, each of said first ends being attached to said hub and each of said second ends being attached to said rim, each of said rods being positioned in one of said spokes such that each of said spokes has at least one rod positioned therein.

3. The assembly according to claim 1, wherein each of said light emitters is positioned adjacent to said hub and being directed toward said rim.

4. An illuminated tire mounting assembly comprising:
    a hub having a central aperture therein for receiving a free end of an axle of a vehicle, said hub having a plurality of bolt receiving openings therein positioned between said aperture and an outer edge of said hub;
    a plurality of spokes being attached to said outer edge of said hub and radially extending outwardly therefrom, each of said spokes consisting of a substantially translucent material, each of said spokes having an outer end;
    a rim having a generally cylindrical shape and having an inner surface and an outer surface, each of said outer ends of said spokes being attached to said rim;
    a plurality of stabilizing rods, each of said rods having a first end and a second end, each of said first ends being attached to said hub and each of said second ends being attached to said rim, each of said rods being positioned in one of said spokes such that each of said spokes has at least one rod positioned therein;
    a plurality of light emitters, each of said light emitters being mounted in one of said spokes such that said spokes are illuminated when said light emitters are turned on, each of said light emitters being positioned adjacent to said hub and being directed toward said rim;
    a power supply being electrically coupled to said light emitters, said power supply comprising at least one battery; and
    an actuator being electrically coupled to said power supply for selectively turning said light emitters on or off.

* * * * *